United States Patent
Power et al.

(10) Patent No.: US 9,688,872 B2
(45) Date of Patent: Jun. 27, 2017

(54) WATERBORNE COATING COMPOSITION USEFUL FOR PROMOTING ADHESION TO PLASTIC SURFACES

(71) Applicant: W.M. BARR & COMPANY, Memphis, TN (US)

(72) Inventors: John W. Power, Memphis, TN (US); Mark Thompson, Memphis, TN (US)

(73) Assignee: W.M. Barr & Company, Inc., Memphis, TN (US)

( * ) Notice: Subject to any disclaimer, the term of this patent is extended or adjusted under 35 U.S.C. 154(b) by 0 days.

(21) Appl. No.: 13/767,609

(22) Filed: Feb. 14, 2013

(65) Prior Publication Data
US 2013/0209792 A1    Aug. 15, 2013

Related U.S. Application Data

(60) Provisional application No. 61/598,676, filed on Feb. 14, 2012.

(51) Int. Cl.
*C09D 133/00*  (2006.01)
*C09D 123/28*  (2006.01)
*C09D 5/00*    (2006.01)

(52) U.S. Cl.
CPC ........... *C09D 133/00* (2013.01); *C09D 5/002* (2013.01); *C09D 123/28* (2013.01); *Y10T 428/264* (2015.01); *Y10T 428/31551* (2015.04); *Y10T 428/31573* (2015.04)

(58) Field of Classification Search
CPC .... C09D 123/28; C09D 133/00; C09D 5/002; C08L 33/14; B05D 1/02; B05D 1/28; B05D 1/38; B05D 3/00; Y10T 428/264; Y10T 428/31551; Y10T 428/31573
USPC ........ 428/255, 423.1, 424.2; 427/322, 393.5, 427/412.1; 524/196, 317, 388, 521
See application file for complete search history.

(56) References Cited

U.S. PATENT DOCUMENTS

| | | | |
|---|---|---|---|
| 5,185,402 A | 2/1993 | Fleming et al. | |
| 5,298,552 A | 3/1994 | Borghi et al. | |
| 5,319,032 A * | 6/1994 | Martz | C08F 8/20 525/301 |
| 5,880,190 A | 3/1999 | Laura | |
| 6,203,913 B1 * | 3/2001 | Kondos et al. | 428/423.1 |
| 6,297,312 B1 | 10/2001 | Wang | |
| 6,403,673 B2 * | 6/2002 | Groves | 522/155 |
| 6,476,119 B1 | 11/2002 | Kucera et al. | |
| 6,555,231 B2 | 4/2003 | Doty et al. | |
| 6,579,932 B1 | 6/2003 | Schipper et al. | |
| 6,593,423 B1 | 7/2003 | Kondos et al. | |
| 6,869,996 B1 | 3/2005 | Krajnik et al. | |
| 6,939,916 B2 * | 9/2005 | Merritt et al. | 525/91 |
| 6,979,714 B2 | 12/2005 | Kondos et al. | |
| 7,776,108 B2 | 8/2010 | Shah et al. | |
| 7,816,449 B2 | 10/2010 | Menovcik et al. | |
| 8,158,727 B2 | 4/2012 | Onoe et al. | |
| 2003/0012959 A1 | 1/2003 | Doty et al. | |
| 2003/0229179 A1 | 12/2003 | Merritt et al. | |
| 2005/0031792 A1 | 2/2005 | Kloeckner et al. | |
| 2005/0239381 A1 | 10/2005 | Mesa et al. | |
| 2006/0160943 A1 | 7/2006 | Weir | |
| 2006/0235160 A1 | 10/2006 | Park et al. | |
| 2007/0224435 A1 | 9/2007 | Nishijima et al. | |
| 2007/0251640 A1 | 11/2007 | Freund et al. | |
| 2008/0022898 A1 | 1/2008 | Sudo et al. | |
| 2008/0255273 A1 | 10/2008 | Pepe et al. | |
| 2008/0276497 A1 | 11/2008 | Chou et al. | |
| 2009/0226728 A1 | 9/2009 | Onoe et al. | |
| 2010/0096082 A1 | 4/2010 | Yamauchi et al. | |
| 2010/0178494 A1 | 7/2010 | Foster et al. | |
| 2011/0059244 A1 | 3/2011 | December et al. | |
| 2011/0104501 A1 * | 5/2011 | Watson et al. | 428/425.1 |

FOREIGN PATENT DOCUMENTS

| | | | |
|---|---|---|---|
| KR | 20080008525 A | 1/2008 | |
| WO | 7900695 A1 | 9/1979 | |
| WO | 9420550 A1 | 9/1994 | |
| WO | 9640819 A1 | 12/1996 | |
| WO | 2013123212 A2 | 8/2013 | |

OTHER PUBLICATIONS

International Search Report and Written Opinion mailed May 10, 2013, for PCT International Application No. PCT/US2013/026168.
Air Products and Chemicals, Inc., "HYBRIDUR 540 Polymer Dispersion", publication "High-Performance Coatings Resins", publication No. 125-05-009-US, copyright 2005, pp. 1-3, website: http://www.airproducts.com/expoxyadditives.
Air Products and Chemicals, Inc., "HYBRIDUR 570 Polymer Dispersion", publication "High-Performance Coatings Resins", publication No. 125-0024, Oct. 2000, pp. 1-7, website: http:/www.airproducts.com/expoxyadditives.
Advanced Polymer, Inc., "Get the API Advantage . . . Hardlen EW-5303", publication Hardlen EW-5303 MSDSI6.DOC, Revised Mar. 24, 2011, pp. 1-7, website: www.advpolymer.com.

(Continued)

*Primary Examiner* — Thao T Tran
(74) *Attorney, Agent, or Firm* — Nelson Mullins Riley & Scarborough, LLP

(57) ABSTRACT

The waterborne coating composition herein is useful for promoting adhesion of paint to a component such as a plastic automobile part or accessory. The waterborne coating composition is particularly useful for promoting adhesion of paint to a thermoplastic polyolefin surface. The waterborne coating composition is prepared from a mixture comprising at least one chlorinated polyolefin resin and at least one urethane acrylic hybrid resin. The waterborne coating composition provides not only good adhesion of a paint to a thermoplastic polyolefin surface, but also provides good appearance. The waterborne coating composition is also compatible with a wide variety of paint systems and can be rapidly dried under ambient conditions.

17 Claims, No Drawings

(56) References Cited

OTHER PUBLICATIONS

Extended Search Report for corresponding European Patent Application No. 13749788.9 dated May 27, 2016; all enclosed pages cited.

* cited by examiner

WATERBORNE COATING COMPOSITION USEFUL FOR PROMOTING ADHESION TO PLASTIC SURFACES

FIELD OF THE INVENTION

The present disclosure relates to waterborne coating compositions useful in promoting adhesion of paint to plastic surfaces.

BACKGROUND

Plastics, such as polyolefins, are useful in many applications such as in fabrication of automobile parts and accessories. Such plastics offer advantages over other types of materials, such as metals like aluminum, for automobile parts and accessories. For example, these materials are less dense than metals, which lowers the overall weight of an automobile and increase vehicle fuel efficiency. Such materials are also more flexible and less expensive than metals. Typically, plastic automobile parts and accessories are painted to achieve a desired finish and appearance as well as to protect the part or accessories from weathering conditions such as sunlight, moisture, heat and cold.

However, the direct application of automotive paint systems to such plastic automobile parts and accessories has drawbacks, including an inadequate adherence of the paint to the parts or accessories. Such direct application may also lead to defects in the paint system, such as fish eyes, orange peel, cratering or cracking.

To circumvent the drawbacks associated with direct paint application to a plastic automobile part or accessory, an adhesion-promoting coating may be disposed on the automobile part or accessory prior to the application of paint. For example, U.S. Pat. No. 6,297,312, hereby incorporated in its entirety, discloses waterborne coating composition comprising a halogenated polyolefin, an anionic polyurethane, a coalescent agent, an anionic surfactant and a wetting agent. Such waterborne coating composition can be applied to a plastic surface, such as a thermoplastic polyolefin (TPO) surface, to facilitate adhesion of a paint system thereon. However, these waterborne coating compositions take about a week to cure under ambient conditions. The waterborne coating composition can be more quickly cured if heated to high temperatures, such as about 160° F.

As another example, U.S. Published Patent Application 2008/0255273, hereby incorporated in its entirety, discloses a waterborne coating composition comprising a polymer for forming a polymer matrix having carboxylate functionality and nano-scale zinc oxide particles dispersed in the polymer. Such waterborne coating composition can be applied to substrates such as glass, metal, polymeric substrates, e.g. polycarbonate (PC), polymethyl methacrylate (PMMA), polyethylene terephthalate (PET), polyvinyl chloride (PVC), polyethylene (PE), polypropylene (PP), polyvinyl butyral (PVB), polyamide (PA), polyesters, polyamides, epoxy, polyurethanes, and siloxanes, wood, cotton, linen, wool, textiles, nonwovens, among other suitable substrates and combinations thereof. However, these waterborne coating compositions also take about a week to cure under ambient conditions.

Generally, waterborne coating compositions tend to produce coatings that do not display suitable adhesion of solventborne paint systems. Similarly, solventborne coating compositions tend to produce coatings that do not display suitable adhesion of waterborne paint systems. Such coating compositions have a limited compatibility with a large segment of the paint market.

Thus, there is a need in the art for a coating that promotes adequate adhesion of paint to a plastic automobile part or accessory as well as for a coating that is compatible with solventborne and waterborne paint systems. There is also a need for a coating that rapidly dries, promotes enhanced durability of the paint and promotes a desired finished appearance.

DETAILED DESCRIPTION

Disclosed herein are waterborne coating compositions useful for promoting adhesion of paint to a component such as a plastic automobile part or accessory. The waterborne coating compositions disclosed herein are particularly useful for promoting adhesion of paint to a thermoplastic polyolefin (TPO) surface. The waterborne coating compositions are prepared from a mixture comprising at least one chlorinated polyolefin resin and at least one urethane acrylic hybrid resin. A waterborne coating composition comprising these components leads to an adhesion promoting coating that imparts good adhesion and good appearance of a paint to a thermoplastic polyolefin (TPO) surface. The adhesion promoting coating is compatible with a wide variety of solventborne, waterborne and multi-component automobile paint systems.

The waterborne coating compositions for promoting adhesion of paint to a plastic surface as disclosed herein are prepared from a mixture comprising at least one chlorinated polyolefin resin and at least one urethane acrylic hybrid resin. The waterborne coating compositions are particularly useful for coating the surfaces of thermoplastic automobile parts and accessories and promote adhesion of paint when applied directly to such surfaces. After drying of the waterborne coating compositions as applied to a plastic surface, an adhesion promoting coating for a wide variety of automotive paint systems is produced. Such automotive paint systems include, but are not limited to, solventborne, waterborne, those useful for original equipment manufacture (OEM) and aftermarket automotive surfaces.

A waterborne coating composition useful for forming a coating that promotes adhesion of paint to plastic surfaces prepared from a mixture comprising at least one chlorinated polyolefin resin in an amount effective to promote adhesion of the coating to a plastic surface, at least one urethane acrylic hybrid resin in an amount effective to counteract tackiness of the chlorinated polyolefin resin and promote rapid drying of the coating, and a balance of water. The waterborne coating is ready to paint after drying for about 20 minutes or less under ambient conditions.

The at least one chlorinated polyolefin resin is present in the composition in an amount effective to promote adhesion of the coating composition to a plastic surface. The at least one urethane acrylic hybrid resin is present in the composition in an amount effective to counteract tackiness of the chlorinated polyolefin resin and to promote rapid drying of the coating.

The coating composition may further comprise at least one of a coalescent solvent, a surfactant, a thickening agent or rheological modifier, a leveling agent, a wetting agent, an alcohol ester, a base such as a hydroxide, water, a silica such as fumed silica, a cross-linking agent, a silane, a preservative, a colorant, a pigment, a wax, a filler, a dye, a matting agent, an anti-settling agent, an anti-skin agent, a defoamer, a nanoparticle and combinations thereof. The coating compositions disclosed herein are also useful for enhancing the durability of the paint as well as promoting the desired appearance of the paint.

Preferably, the waterborne coating composition is prepared from a mixture that comprises about 20.0 to about 40.0 wt % based on total dry resin solids content of the at least one chlorinated polyolefin (CPO) resin, and about 80.0 to about 60.0 wt % based on total dry resin solids content of the at least one urethane acrylic hybrid resin (UAHR). It is also preferable to have the chlorinated polyolefin resin and the urethane acrylic hybrid resin present in the mixture in at least about a 1:1 wt % ratio of dry resin solids, respectively, to about a 1:4 wt % ratio of dry resin solids, respectively.

Suitable chlorinated polyolefin resins for use in the mixture disclosed herein may include, without limitation, chlorinated polyethylene, chlorinated polypropylene, chlorinated ethylene-propylene copolymer, chlorinated polyisobutylene, chlorinated polybutene, and chlorinated ethylene-vinyl acetate copolymer. Such chlorinated polyolefin resins are generally commercially available. For example, the chlorinated polyolefin resins may include HARDLEN 5303EW (available from Advanced Polymer Inc.), SUPERCHLON S4268 (available from PhibroChem), TRAPYLENE 6800W, SUPERCHLON S4196 (available from PhibroChem), ADVANTIS CP347W (available from Eastman Chemical), HARDLEN 8511 (available from Advanced Polymer Inc.), TRAPYLENE 6700W and SUPERCHLON E415 (available from PhibroChem). A preferred chlorinated polyolefin resin is HARDLEN 5303EW which is a liquid dispersion of about 30.0 wt % dry resin solids.

Preferably, the chlorinated polyolefin resin is contained in the mixture in a range of about 1.0-45.0 wt % based on total dry resin solids content, or from about 5.0-45.0 wt %, or from about 20.0-30.0 wt %, or from about 35.0-45.0 wt %, e.g., 1.0-5.0 wt %, 5.0-10.0 wt %, 10.0-15.0 wt %, 15.0-20.0 wt %, 20.0-25.0 wt %, 25.0-30.0 wt %, 30.0-35.0 wt %, 35.0-40.0 wt %, 40.0-45.0 wt %.

Suitable urethane acrylic hybrid resins for use in the mixture disclosed herein may include, without limitation, ethylene acrylic acid copolymer, urethane, HYBRIDUR 570, CUR 99 urethane (available from Alberdink), LUX 99 (available from Alberdink), U615 (available from Alberdink), HD 5004 (available from Hauthane), HPP3010 (available from Accurez), AROLON 850-W-45 (available from Reichold), CHEMPOL 520 and UROTUF 53-MPW-30. A preferred urethane acrylic hybrid resin is HYBRIDUR 570 which is a liquid dispersion of about 42.0 wt % dry resin solids.

Preferably, the urethane acrylic hybrid resin comprises at least one functional group. Suitable functional groups may include, without limitation, carboxyl groups, hydroxyl groups, amino groups, amide groups, mercaptan groups, epoxy groups, isocyanate groups, carbamate groups and combinations thereof. Preferably, the urethane acrylic hybrid resin is contained in the mixture in a range of about 1.0-85.0 wt % based on total dry resin solids content, or from about 5.0-80.0 wt %, e.g., from about 55.0-65.0 wt %, or from about 70.0-80.0 wt %, e.g., 1.0-5.0 wt %, 5.0-10.0 wt %, 10.0-15.0 wt %, 15.0-20.0 wt %, 20.0-25.0 wt %, 25.0-30.0 wt %, 30.0-35.0 wt %, 35.0-40.0 wt %, 40.0-45.0 wt %, 45.0-50.0 wt %, 50.0-55.0 wt %, 55.0-60.0 wt %, 60.0-65.0 wt %, 65.0-70.0 wt %, 70.0-75.0 wt %, 75.0-80.0 wt % or 80.0-85.0 wt %.

The mixture may further comprise other components to modify the properties of the composition. For example, and without limitation, other components may be added to the mixture to modify the composition's rheological properties, chemical resistance and/or hardness. Other components, without limitation, may also be included to modify the drying time of the mixture once it is applied to a plastic surface.

Thus, such other components may be, without limitation, at least one of a coalescent solvent, a surfactant, a thickening agent or rheological modifier, a leveling agent, a wetting agent, an alcohol ester, a base such as a hydroxide, water, a silica such as fumed silica, a cross-linking agent, a silane, a preservative, a colorant, a pigment, a wax, a filler, a dye, a matting agent, an anti-settling agent, an anti-skin agent, a defoamer, a nanoparticle, and combinations of two or more thereof.

The mixtures from which the waterborne coating compositions are made may be either homogeneous (e.g., liquid) or heterogeneous (e.g., liquid+solid), as certain components of the mixture may not be readily soluble in water. Preferably, the mixtures are heterogeneous, as, for example, the chlorinated polyolefin and urethane acrylic hybrid resin are sparingly soluble in aqueous media. For example, the CPO and UAHR are commercially available as resin dispersions in water. It is these aqueous resin dispersions that may be added to the mixtures that form the waterborne coating composition.

The mixture described herein may also comprise a surfactant, which may be those that are anionic, cationic, amphoteric or non-ionic. Cationic, anionic and amphoteric surfactants may comprise, without limitation, sulfates, sulfonates, phosphate and carboxylates. Non-ionic surfactants may comprise, without limitation, an alcohol, ester or ether. The surfactant preferably comprises a combination, or additive blend, of surfactants such as a leveling agent and a wetting agent. Preferably, the additive blend comprises at least one of TROY KYD D11, SURFYNOL 104E, BYK 381 and TROY LAC. More preferably, the mixture comprises an additive blend of SURFYNOL 104E, which is 2,4,7,9-tetramethyldec-5-yne-4,7-diol and BYK 381, a modified acrylate. The surfactant is present in the mixture in an amount effective to lower the surface tension of the composition. Preferably, the surfactant or additive blend is contained in the mixture in a range of about 0.1-5.0 wt % or 0.25-1.0 wt %. In a preferred embodiment, the mixture comprises about 0.2-0.3 wt % wetting agent and about 0.1-0.2 wt % leveling agent.

The mixture described herein may also comprise at least one coalescent solvent. Non-limiting examples of such coalescent solvent(s) include water, ethylene glycol derivatives, propylene glycol derivatives, an N-methylpyrrolidone and alcohol ester derivatives. Preferably, the coalescent solvent(s) for the mixture described herein is a combination of an ethylene glycol derivative and alcohol ester derivative. Such ethylene glycol derivatives may be GLYCOL ETHER EB or ethylene glycol phenyl ether. Such alcohol ester derivatives may be TEXANOL, which is (2,2,4-trimethyl-1,3-pentanediol mono(2-methylpropanoate)).

An advantage of the coalescent solvent(s) used for the mixture described herein is that such solvent(s) are safer for the environment as opposed to the more conventionally used organic solvent systems. The coalescent solvent(s) is/are present in the mixture in an amount effective to promote wetting of the plastic surface to be coated with the mixture described herein. The coalescent solvent(s) is present in a range of about 0.1-10.0 wt %. Preferably, the range is about 0.5-5.0 wt % or about 2.0-3.0 wt %. More preferably, the mixture comprises about 1-2.0 wt % TEXANOL and about 0.5-1.0 wt % GLYCOL ETHER EB.

The mixture described herein may also comprise a thickener or rheological modifier, which may be at least one of a cellulose derivative, an acrylic thickener, a clay, a hydrophobically-modified ethoxylated urethane (HEUR) or a hydrophobically-modified alkali swellable emulsion (HASE). This group of thickeners or rheological modifiers can be divided into two different thickening mechanisms whereby cellulose derivatives, acrylic thickeners and clays have a thickening effect of the aqueous phase whereas HASE and HEUR thickeners have an associative mechanism providing viscosity by interacting with other ingredients of a coating formulation or composition. Preferably, the thickener or rheological modifier is a clay, HEUR or HASE, such as TAFIGEL PUR 60, TAFIGEL PUR 61, TAFIGEL PUR 40, ACRYSOL RM8, CARBOPOL ETD and RHEOLATE 266. Most preferably, the thickener or rheological modifier is TAFIGEL PUR 60. When included in the mixture described herein, the thickener or rheological modifier is included in a range of less than about 5.0 wt %, and preferably, in a range of about 0.01-3.0 wt %.

The mixture described herein promotes fast drying times when applied to a plastic surface due to rapid dehydration of the urethane acrylic hybrid resin. However, drying times of the mixture can be further enhanced by the inclusion of a filler such as fumed silica or other filler. For example, in performing aftermarket automobile body repairs, time is a critical factor in the cost of the repair and applied films that require long drying times are deemed unattractive and tend to interrupt normal work flow in a typical body shop. Thus, a mixture that comprises a filler such as fumed silica or other filler may be more desirable.

The inclusion of a filler such as fumed silica or other filler can reduce the drying time of the mixture to about 5-10 minutes. The inclusion of a filler can also enhance adhesion by providing increased surface area for attachment to subsequent paint layers. The filler, such as fumed silica, may be included in a range of up to 20.0 wt %, and preferably, in a range of about 0.01-10.0 wt %.

The mixture described herein may also produce a more durable coating by inclusion of a cross-linking agent and/or silane in the mixture, thereby increasing the chemical resistance and hardness of the coating. The cross-linking agent should be capable of reacting with at least one functionality on the chlorinated polyolefin resin and/or the urethane acrylic hybrid resin to form a cross-linked co-polymeric system. The cross-linking agent may be, without limitation, zirconium ammonium carbonate, a titanate, or a melamine. The silane may react with the urethane acrylic hybrid resin of the composition in order to strengthen or toughen the barrier properties of the coating, thereby decreasing the migration of corrosive chemicals across the coating. The silane may be, without limitation, an alkyl silane with at least one functional group of carboxyl groups, hydroxyl groups, amino groups, amide groups, mercaptan groups, epoxy groups, isocyanate groups, carbamate groups and combinations thereof. The cross-linking agent or silane is included in a range of up to about 10.0 wt %, and preferably, in a range of about 0.01-5.0 wt %.

The mixture described herein may also comprise a base such as a hydroxide. The inclusion of a base in the mixture serves to smooth out the viscosity of the coating composition as well as to act as a buffer to preserve the pH of the coating composition. The base is not particularly limited and may be a hydroxide, such as sodium hydroxide, potassium hydroxide, lithium hydroxide or ammonium hydroxide. Preferably, the base included in the mixture is ammonium hydroxide. The base may be present in the mixture in a range of about 0.01-0.5 wt %. Preferably, the base is present in a range of about 0.05-0.15 wt %.

The mixture described herein may also comprise a preservative. Such a preservative is added to the mixture described herein to increase shelf life of the mixture. The preservative may be an antimicrobial additive, such as PREVENTOL P91, which is a propanediol derivative. Specifically, PREVENTOL P91 is (2-bromo-2-nitro-1,3-propanediol). Preferably, the preservative is contained in the mixture in a range of about 0.1-0.5 wt %.

Methods of making the mixture described herein are not particularly limited and may comprise mixing: at least one chlorinated polyolefin resin in an amount effective to promote adhesion of the coating to a plastic surface; and at least one urethane acrylic hybrid resin in an amount effective to counteract tackiness of the chlorinated polyolefin resin and promote rapid drying of the coating. More specifically, the methods of making the mixture described herein may comprise mixing: about 0.1 to about 45.0 wt % of the at least one chlorinated polyolefin resin; and about 0.1 to about 45.0 wt % of the at least one urethane acrylic hybrid resin.

The methods may further comprise mixing at least one of the following components: a coalescent solvent, a surfactant, a thickening agent or rheological modifier, a leveling agent, a wetting agent, an alcohol ester, a base, a filler, a cross-linking agent, a silane, a preservative, a colorant, a pigment, a wax, a filler, a dye, a matting agent, an anti-settling agent, an anti-skin agent, a defoamer, a nanoparticle and combinations thereof.

In a first preferred embodiment, the waterborne coating composition was found to produce a coated TPO surface that provided satisfactory adhesion and appearance of automotive paint systems when the mixture comprises: about 15.0-25.0 wt % of a liquid chlorinated polyolefin (CPO) resin dispersion containing about 30.0% dry resin solids (corresponding to about 4.5 to 7.5 wt % CPO dry resin solids), about 15.0-25.0 wt % of a liquid urethane acrylic hybrid resin (UAHR) dispersion containing about 42.0% dry resin solids (corresponding to about 6.3 to 10.5 wt % UAHR dry resin solids), about 2.0-4.0 wt % of at least one coalescent solvent, about 0.25-1.0 wt % of at least one surfactant, about 0.25-1.0 wt % of a clay, hydrophobically-modified ethoxylated urethane and/or a hydrophobically-modified alkali swellable emulsion, about 0.05-0.15 wt % of ammonium hydroxide, about 0.1-0.5 wt % of a propanediol and about 50.0-60.0 wt % water.

In a second preferred embodiment, the waterborne coating composition was found to produce a coated TPO surface that provided satisfactory adhesion and appearance of automotive paint systems when the mixture comprises: about 15.0-25.0 wt % of a liquid chlorinated polyolefin resin (CPO) dispersion containing about 30.0% dry resin solids (corresponding to about 4.5 to 7.5 wt % CPO dry resin solids), about 35.0-45.0 wt % of a liquid urethane acrylic hybrid resin (UAHR) dispersion containing about 42.0% dry resin solids (corresponding to about 14.7 to 18.9 wt % UAHR dry resin solids), about 2.0-4.0 wt % of at least one coalescent solvent, about 0.25-1.0 wt % of at least one surfactant, about 0.25-1.0 wt % of a hydrophobically-modified ethoxylated urethane and/or a hydrophobically-modified alkali swellable emulsion, about 0.05-0.15 wt % of ammonium hydroxide, about 0.1-0.5 wt % of a propanediol and about 30.0-45.0 wt % water.

The mixture described herein optionally may be colored, if desired, by utilization of customary pigments and colorant grinding, milling and dispersion methods.

The mixture described herein may be applied to a plastic surface, particularly a thermoplastic surface formed from a thermoplastic olefin, applying the coating composition to at least a portion of the surface to form a coated surface comprising an adhesion promoting coating, and painting the coated surface. Applying the mixture described herein to an olefin or plastic surface is not particularly limited and may be accomplished by any number of techniques. Such techniques include spraying, brushing or rolling. Preferably, the mixture is applied by spraying. Preferably, the mixture is applied to have a thickness of from about 0.01-2.5 mils and more preferably, from about 0.05-1.5 mils. If the coating is applied with a thickness of greater than about 2.5 mils, the coating may not provide adequate adhesion properties.

Drying of the applied mixture, prior to painting, is also not particularly limited and may be accomplished by any number of techniques. Drying may be accomplished by allowing the coated surface to air-dry by sitting in an ambient environment until dry. Drying may also be accomplished by heating the coated surface. When air-drying, the drying time of the mixture is less than about 20 minutes and preferably, less than about 15 minutes. The application of heat to the drying process can reduce the drying time. For example, heating the coated surface to a temperature of about 80-90° F. can reduce the drying time to about 5-10 minutes. Incorporating air flowing over the coated surface while heating can reduce the drying time to about 5 minutes.

Cleaning of the plastic surface prior to application of the mixture may be undertaken to remove dust, debris and contaminants thereon to ensure the mixture's adherence to the surface to be coated is maximized. Plastic materials, such as thermoplastic polyolefin (TPO) materials, that are designed and manufactured for automobile parts or accessories, such as bumpers, often contain chemicals and/or compounds used as releasing agents. Such releasing agents facilitate the release of these automobile parts or accessories from the molds used for their formation. However, these releasing agents may interfere with the adhesion of coatings applied to TPO automobile parts or accessories and need to be removed prior to any coating application. The plastic surface may be treated to clean the surface of dust and debris and to impart roughness to the surface.

Cleaning of the plastic surface that will receive the mixture may be done mechanically or chemically. If mechanical, an abrasive, such as sandpaper, may be used. Other abrasives may be metal oxide abrasives or hard plastic abrasives. If chemical, mineral spirits may be used. A scuff pad may be used to roughen the plastic surface prior to application of the mixture. Such cleaning not only removes the release agents but also further roughens the surface which enhances adhesion of the coating to be applied thereon. After the plastic surface is cleaned, the mixture described herein may be applied thereto.

After drying, a coated surface comprising the adhesion promoting coating is realized. The coating preferably comprises the CPO in a range of about 20.0 to 40.0 wt % resin based on total resin weight in the dried coating. The coating preferably comprises the UAHR in a range of about 80.0 to 60.0 wt % resin based on total resin weight in the dried coating. Total resin weight, as referred to herein, is meant to be the resinous, solid and polymeric components of the mixture, after curing and/or evaporation of liquids and drying, including the at least one chlorinated polyolefin resin and at least one urethane acrylic hybrid resin. Total resin weight may also include, but is not limited to, other resinous, solid and polymeric components in the mixture, from which the coating compositions described herein are formed.

The plastic surface that the mixture described herein may be applied to is not particularly limited and may be any olefin, such as TPO, or plastic component, such as acrylate butadiene styrene (ABS), fiberglass, and sheet molded compounds (SMC) comprising a surface that requires paint to be disposed thereon.

Preferably, the plastic surface includes those of an automotive component, part, or accessory. Such surfaces may include, without limitation, exterior surfaces such as a bumper such as a thermoplastic molded bumper formed from a thermoplastic olefin, a door, a fender, a body panel, a side-panel, a hood, a trunk, a side-view mirror, or a roof, as well as interior surfaces such as a dashboard or a door panel. When applied to these automotive components, the mixture is preferably applied to an exposed surface of these components.

The paint used to paint the coated plastic surfaces described above are not particularly limited and may be any automobile paint, such as waterborne paints, solventborne paints and multi-component paints. Such paints or paint systems generally include at least one color coating followed by at least one clear coating and are commercially available from vendors such as Sikkens-AkzoNobel, DuPont, PPG, Glasurit-BASF, Spies Hecker, and Sherwin-Williams.

The following sets forth non-limiting examples of waterborne coating compositions made from the mixtures described herein.

For each of the Examples discussed below, the mixtures were prepared with commercially available HARDLEN 5303EW and HYBRIDUR 570 aqueous resin dispersions. For HARDLEN 5303EW, the commercially available aqueous resin dispersion comprised about 30.0 wt % dry resin solids material. For HYBRIDUR 570, the commercially available aqueous resin dispersion comprised about 42.0 wt % dry resin solids material.

After each mixture was prepared to form a coating composition, the composition was applied, by spraying, to a portion of 8 separate pieces of a thermoplastic polyolefin (TPO) automobile bumper, forming 8 coated TPO samples. The coated TPO samples were then dried by air-drying in an ambient environment for about 15 minutes.

After drying was complete, each of the 8 coated TPO samples was painted with a different waterborne automobile paint system such that, for each Example, none of the 8 coated TPO samples was painted with the same waterborne automotive paint system. Each TPO coated sample was painted with a color coating followed by a clear coating.

Adhesion testing was carried out according to the ASTM D 3359 crosshatch adhesion tape test method, using SCOTCH 898 pressure sensitive tape. If none of the paint adhered to the pressure sensitive tape, the coating composition was deemed to impart good adhesion properties of the waterborne automotive paint system applied to the TPO surface. If paint adhered to the pressure sensitive tape, the coating composition was deemed to impart poor adhesion properties of the waterborne automotive paint system applied to the TPO surface.

Appearance testing was carried out by visual inspection of the painted TPO surface to determine the presence of defects, such as fisheyes, orange peel, cratering or cracking. If the paint failed to form a continuous, uniform layer on the coated TPO surface, the coating composition was deemed to impart a poor appearance to the painted TPO surface. If the paint formed a continuous, uniform layer on the coated TPO surface, the coating composition was deemed to impart a good appearance to the painted TPO surface.

Example 1

A mixture was prepared using about 20.0 wt % of HARDLEN 5303EW (added as an aqueous dispersion comprising about 30.0 wt % dry resin solids), about 21.0 wt % HYBRIDUR 570 (added as an aqueous dispersion comprising about 42.0 wt % dry resin solids), about 1.3 wt % TEXANOL, about 1.1 wt % GLYCOL ETHER EB, about 0.65 wt % PUR 60, about 0.30 wt % BYK 381, about 0.2 wt % SURFYNOL 104E, about 0.09 wt % ammonium hydroxide, about 0.36 wt % PREVENTOL P91 and about 55.0 wt % water to form a coating composition.

The coating composition was applied to the TPO surfaces by spraying to form an adhesion promoting coating, after drying, with a thickness of about 0.5 mil. The adhesion promoting coating comprised about 40.0 wt % of the CPO based on total dry resin solids and about 60.0 wt % resin of the UAHR based on total dry resin solids in the dried coating.

The adhesion promoting coating produced painted TPO surfaces that demonstrated good adhesion and good appearance for each of the 8 samples.

Example 2

A mixture was prepared using about 20.0 wt % of HARDLEN 5303EW (added as an aqueous dispersion comprising about 30.0 wt % dry resin solids), about 40.0 wt % HYBRIDUR 570 5303EW (added as an aqueous dispersion comprising about 42.0 wt % dry resin solids), about 1.4 wt % TEXANOL, about 1.2 wt % GLYCOL ETHER EB, about 0.45 wt % PUR 60, about 0.3 wt % BYK 381, about 0.2 wt % SURFYNOL 104E, about 0.09 wt % ammonium hydroxide, about 0.36 wt % PREVENTOL P91 and about 36.0 wt % water to form a coating composition.

The coating composition was applied to the TPO surfaces by spraying to form an adhesion promoting coating, after drying, with a thickness of about 0.5 mil. The adhesion promoting coating comprised about 26.0 wt % of the CPO based on total dry resin solids and about 74.0 wt % resin of the UAHR based on total dry resin solids in the dried coating.

The adhesion promoting coating produced painted TPO surfaces that demonstrated good adhesion and good appearance for each of the 8 samples.

Example 3

A mixture was prepared using about 20.0 wt % of HARDLEN 5303EW (added as an aqueous dispersion comprising about 30.0 wt % dry resin solids), about 21.0 wt % HYBRIDUR 570 (added as an aqueous dispersion comprising about 42.0 wt % dry resin solids), about 1.3 wt % TEXANOL, about 1.1 wt % GLYCOL ETHER EB, about 0.65 wt % PUR 60, about 0.3 wt % BYK 381, about 0.2 wt % TROY LAC, about 0.09 wt % ammonium hydroxide, about 0.36 wt % PREVENTOL P91 and about 55.0 wt % water to form a coating composition.

The coating composition was applied to the TPO surfaces by spraying to form an adhesion promoting coating, after drying, with a thickness of about 0.5 mil. The adhesion promoting coating comprised about 40.0 wt % of the CPO based on total dry resin solids and about 60.0 wt % resin of the UAHR based on total dry resin solids in the dried coating.

The adhesion promoting coating produced painted TPO surfaces that demonstrated good adhesion for each of the 8 samples but poor appearance for 2 of the 8 samples.

Example 4

A mixture was prepared using about 20.0 wt % of HARDLEN 5303EW (added as an aqueous dispersion comprising about 30.0 wt % dry resin solids), about 21.0 wt % HYBRIDUR 570 (added as an aqueous dispersion comprising about 42.0 wt % dry resin solids), about 1.3 wt % TEXANOL, about 1.1 wt % GLYCOL ETHER EB, about 0.65 wt % PUR 60, about 0.5 wt % TROY LAC, about 0.09 wt % ammonium hydroxide, about 0.36 wt % PREVENTOL P91 and about 55.0 wt % water to form a coating composition.

The coating composition was applied to the TPO surfaces by spraying to form an adhesion promoting coating, after drying, with a thickness of about 0.5 mil. The adhesion promoting coating comprised about 40.0 wt % of the CPO based on total dry resin solids and about 60.0 wt % resin of the UAHR based on total dry resin solids in the dried coating.

The adhesion promoting coating produced painted TPO surfaces that demonstrated good adhesion for each of the 8 samples but poor appearance for 2 of the 8 samples.

Example 5

A mixture was prepared using about 10.0 wt % of HARDLEN 5303EW (added as an aqueous dispersion comprising about 30.0 wt % dry resin solids), about 30.0 wt % HYBRIDUR 570 (added as an aqueous dispersion comprising about 42.0 wt % dry resin solids), about 1.5 wt % TEXANOL, about 1.1 wt % GLYCOL ETHER EB, about 0.19 wt % PUR 60, about 0.5 wt % TROY LAC, about 0.09 wt % ammonium hydroxide, about 0.2 wt % PREVENTOL P91 and about 56.4 wt % water to form a coating composition.

The coating composition was applied to the TPO surfaces by spraying to form an adhesion promoting coating, after drying, with a thickness of about 0.5 mil. The adhesion promoting coating comprised about 20.0 wt % of the CPO based on total dry resin solids and about 80.0 wt % resin of the UAHR based on total dry resin solids in the dried coating.

The adhesion promoting coating produced painted TPO surfaces that demonstrated good adhesion for each of the 8 samples but poor appearance for 2 of the 8 samples.

Although the present invention has been described in connection with preferred embodiments thereof, it will be appreciated by those skilled in the art that additions, deletions, modifications, and substitutions not specifically described can be made without departing from the spirit and scope of the invention as defined in the appended claims.

What is claimed is:
1. A coating on a plastic surface wherein:
   The coating formed from a waterborne coating composition prepared from a mixture consisting essentially of:
   at least one chlorinated polyolefin resin in an amount effective to promote adhesion of the coating to a plastic surface, at least one urethane acrylic hybrid resin in an amount effective to counteract tackiness of the chlorinated polyolefin resin and promote rapid drying of the coating,
at least one coalescent solvent,
at least one surfactant,
at least one of:
 a clay,
 a hydrophobically-modified ethoxylated urethane, or
 a hydrophobically-modified alkali swellable emulsion;
at least one base,
at least one propanediol, and
water, and
wherein the chlorinated polyolefin resin is present in the mixture at about 35.0 to 45.0 wt % based on total dry resin solids content; and
wherein the urethane acrylic hybrid resin is present in the mixture at about 55.0-65.0 wt % based on total dry resin solids content.

2. The coating according to claim 1 wherein the coating: has a thickness of from about 0.01 to about 2.5 mils.

3. A coated plastic component, comprising:
a plastic substrate having a surface;
an adhesion promoting coating disposed on the surface of the plastic substrate, the coating formed from a waterborne coating composition prepared from a mixture consisting essentially of:
 at least one chlorinated polyolefin resin in an amount effective to promote adhesion of the coating to a plastic surface,
 at least one urethane acrylic hybrid resin in an amount effective to counteract tackiness of the chlorinated polyolefin resin and promote rapid drying of the coating, and
 at least one coalescent solvent;
 at least one surfactant;
 at least one of:
  a clay,
  a hydrophobically-modified ethoxylated urethane, or
  a hydrophobically-modified alkali swellable emulsion;
 at least one base;
 at least one propanediol; and
 water; and
 wherein the chlorinated polyolefin resin is present in the mixture at about 35.0 to 45.0 wt % based on total dry resin solids content;
 wherein the urethane acrylic hybrid resin is present in the mixture at about 55.0-65.0 wt % based on total dry resin solids content.

4. The coated plastic component according to claim 3 further comprising an automotive paint on the adhesion promoting coating, wherein the plastic substrate is a plastic automotive component.

5. The coated plastic component according to claim 4 wherein:
the plastic automotive component is a bumper, a door, a fender, a body panel, a side-panel, a hood, a trunk, or a roof;
the adhesion promoting coating is on an exterior surface thereof;
and the automotive paint is a waterborne automotive paint.

6. The coated plastic component according to claim 4 wherein the plastic automotive component is formed at least partially from a thermoplastic olefin.

7. The coated plastic surface according to claim 6 wherein the plastic automotive component is a bumper.

8. A method of painting a plastic automotive component, comprising:
applying, to at least a portion of a surface of a plastic automotive component, a waterborne coating composition to form an adhesion-promoting coating, the waterborne coating composition prepared from a mixture consisting essentially of:
 at least one chlorinated polyolefin resin in an amount effective to promote adhesion of the coating to a plastic surface,
 at least one urethane acrylic hybrid resin in an amount effective to counteract tackiness of the chlorinated polyolefin resin and promote rapid drying of the coating, and
 at least one coalescent solvent;
 at least one surfactant;
 at least one of:
  a clay,
  a hydrophobically-modified ethoxylated urethane, or
  a hydrophobically-modified alkali swellable emulsion;
 at least one base;
 at least one propanediol; and
 water; and
 wherein the chlorinated polyolefin resin is present in the mixture at about 35.0 to 45.0 wt % based on total dry resin solids content; and
 wherein the urethane acrylic hybrid resin is present in the mixture at about 55.0-65.0 wt % based on total dry resin solids content; and
painting the coated surface of the plastic automotive component with an automotive paint.

9. The method according to claim 8, further comprising:
cleaning at least a portion of the surface of the plastic automotive component to remove dust, debris and contaminants from the surface of the plastic automotive component; and
applying the waterborne coating composition on a cleaned portion of the surface.

10. The method according to claim 8, further comprising drying the adhesion-promoting coating for about 20 minutes or less under ambient conditions prior to painting the coated surface with an automotive paint.

11. The method according to claim 8, further comprising heating the adhesion-promoting coating for less than about 5 minutes.

12. The method according to claim 8 wherein applying the waterborne coating composition comprises spraying, brushing or rolling.

13. A method of making a waterborne coating composition for forming a coating that promotes adhesion of paint to plastic surfaces, comprising:
mixing:
 at least one chlorinated polyolefin resin in an amount effective to promote adhesion of the coating to a plastic surface, and
 at least one urethane acrylic hybrid resin in an amount effective to counteract tackiness of the chlorinated polyolefin resin and promote rapid drying of the coating
 at least one coalescent solvent;
 at least one surfactant;
 at least one of:
  a clay,
  a hydrophobically-modified ethoxylated urethane, or a hydrophobically-modified alkali swellable emulsion;
at least one base;
at least one propanediol; and
water; and
wherein the chlorinated polyolefin resin is present in the mixture at about 35.0 to 45.0 wt % based on total dry resin solids content;
wherein the urethane acrylic hybrid resin is present in the mixture at about 55.0-65.0 wt % based on total dry resin solids content.

14. A waterborne coating composition for forming a paint adhesion-promoting coating on a plastic surface, the waterborne coating composition prepared from a mixture consisting essentially of:
   at least one chlorinated polyolefin resin in an amount effective to promote adhesion of the coating to a plastic surface;
   at least one urethane acrylic hybrid resin in an amount effective to counteract tackiness of the chlorinated polyolefin resin and promote rapid drying of the coating;
   at least one coalescent solvent;
   at least one surfactant;
   at least one of:
      a clay,
      a hydrophobically-modified ethoxylated urethane, or
      a hydrophobically-modified alkali swellable emulsion;
   at least one base;
   at least one propanediol; and
   water; and
   wherein the chlorinated polyolefin resin is present in the mixture at about 35.0 to 45.0 wt % based on total dry resin solids content;
   wherein the urethane acrylic hybrid resin is present in the mixture at about 55.0-65.0 wt % based on total dry resin solids content, and
   wherein the coating formed by the waterborne coating composition is ready to have a paint layer applied thereon after drying for about 20 minutes or less under ambient conditions.

15. A waterborne coating composition for forming a paint adhesion-promoting coating on a plastic surface, the waterborne coating composition prepared from a mixture consisting essentially of:
   at least one chlorinated polyolefin resin in an amount effective to promote adhesion of the coating to a plastic surface;
   at least one urethane acrylic hybrid resin in an amount effective to counteract tackiness of the chlorinated polyolefin resin and promote rapid drying of the coating;
   at least one coalescent solvent;
   at least one surfactant;
   at least one of:
      a clay,
      a hydrophobically-modified ethoxylated urethane, or
      a hydrophobically-modified alkali swellable emulsion;
   at least one base;
   at least one propanediol; and
   water; and
   wherein the chlorinated polyolefin resin is present in the mixture at about 35.0 to 45.0 wt % based on total dry resin solids content; and
   wherein the urethane acrylic hybrid resin is present in the mixture at about 55.0-65.0 wt % based on total dry resin solids content.

16. The waterborne coating composition according to claim 15 wherein the mixture comprises a coalescent solvent comprising an ethylene glycol derivative and an alcohol ester.

17. The waterborne coating composition according to claim 15 wherein the surfactant is a surfactant blend comprising a wetting agent and a leveling agent.

* * * * *